(12) United States Patent
Singh

(10) Patent No.: US 8,193,761 B1
(45) Date of Patent: Jun. 5, 2012

(54) HYBRID POWER SOURCE

(75) Inventor: Harmohan N. Singh, Rockaway, NJ (US)

(73) Assignee: Honeywell International, Inc., Morristown, NJ (US)

( * ) Notice: Subject to any disclaimer, the term of this patent is extended or adjusted under 35 U.S.C. 154(b) by 1244 days.

(21) Appl. No.: 11/937,341

(22) Filed: Nov. 8, 2007

(51) Int. Cl.
*H02J 7/14* (2006.01)
*H02J 7/00* (2006.01)

(52) U.S. Cl. ......... 320/104; 320/128; 320/167; 307/64

(58) Field of Classification Search .............. 320/104
See application file for complete search history.

(56) References Cited

U.S. PATENT DOCUMENTS

| | | | | |
|---|---|---|---|---|
| 5,260,637 A * | 11/1993 | Pizzi | .............. | 320/103 |
| 5,631,532 A * | 5/1997 | Azuma et al. | ................. | 320/102 |
| 5,916,699 A | 6/1999 | Thomas et al. | | |
| 6,774,636 B2 * | 8/2004 | Guiheen et al. | ............... | 324/429 |
| 6,793,027 B1 | 9/2004 | Yamada et al. | | |
| 7,136,701 B2 | 11/2006 | Greatbatch et al. | | |
| 7,207,405 B2 | 4/2007 | Reid et al. | | |
| 2003/0155887 A1 * | 8/2003 | Bourilkov et al. | ............ | 320/104 |
| 2004/0245031 A1 | 12/2004 | Reid et al. | | |
| 2005/0249989 A1 * | 11/2005 | Pearson | ........................ | 429/13 |
| 2006/0133007 A1 | 6/2006 | Shiue et al. | | |
| 2007/0090808 A1 | 4/2007 | McCabe et al. | | |
| 2007/0163844 A1 * | 7/2007 | Jahkonen | ...................... | 187/290 |
| 2008/0094031 A1 * | 4/2008 | Singh et al. | ................... | 320/132 |

* cited by examiner

*Primary Examiner* — M'Baye Diao
(74) *Attorney, Agent, or Firm* — Shimokaji & Assoc., PC

(57) ABSTRACT

A hybrid power system is comprised of a high energy density element such as a fuel-cell and high power density elements such as a supercapacitor banks. A DC/DC converter electrically connected to the fuel cell and converting the energy level of the energy supplied by the fuel cell. A first switch is electrically connected to the DC/DC converter. First and second supercapacitors are electrically connected to the first switch and a second switch. A controller is connected to the first switch and the second switch, monitoring charge levels of the supercapacitors and controls the switching in response to the charge levels. A load is electrically connected to the second switch. The first switch connects the DC/DC converter to the first supercapacitor when the second switch connects the second supercapacitor to the load. The first switch connects the DC/DC converter to the second supercapacitor when the second switch connects the first supercapacitor to the load.

8 Claims, 6 Drawing Sheets

HYBRID POWER SOURCE

GOVERNMENT RIGHTS

This invention was made with Government support under Collaborative Technology Alliances Power & Energy Consortium contract DAAD19-01-2-0010 awarded by the Army Research Lab. The Government has certain rights in this invention.

BACKGROUND OF THE INVENTION

A power source supplies a current at a voltage to a load for a period of time. Characteristics of the load typically define the kind of power source that is appropriate. Electronic circuits may demand a relatively small current for an extended period of time. A mechanical device may demand a short burst of relatively high current to generate a powerful motion. Some loads, like an electric vehicle may require smaller currents for motion over a flat surface and a larger current to move up an incline.

Electric powered vehicles may employ large lead acid batteries to provide energy for their traction systems and operating systems. A battery of this type typically delivers from 24 to 48 volts. A traction system may be powered to move an electric powered vehicle around the workplace under the control of an operator or a computer. Traction systems may draw large currents from the DC bus during acceleration or when moving up an incline, but normally demand lower currents for extended periods of time. Operating systems, such as a lift system, may consume a significant portion of the stored power during normal truck operation. When lifting heavy loads, the operating systems may demand large currents for short periods.

A conventional lift truck will typically operate from 5 to 6 hours on a fully charged battery. When the battery voltage drops below a certain level the truck is driven to a battery station where the depleted battery is removed and a fully charged replacement battery is installed. This operation typically requires from 20 to 30 minutes during which the truck and operator are nonproductive.

Efforts have been made to improve the vehicle designs, particularly in ways that will increase the productive period of the battery. For example, the battery may be recharged during truck operation by an alternator, generating charging currents with motions of the traction and lift systems. While this approach does recover some of the energy, lead acid batteries are inefficient energy recovery devices. A large portion of the regenerated energy is dissipated as heat and lost. Periods when large currents are drawn during truck operation significantly limit battery life.

As can be seen, there is a need for power sources capable of providing large currents in short bursts and lower currents over an extended period of time. A hybrid power source consisting of a high power source and a high energy source can result in a high energy and as well as high power device when the load duty cycle of each component power source is actively managed. For example: a fuel-cell, which is a high energy density device, may be hybridized with a supercapacitor, a high power device, to construct such a source. A supercapacitor or ultracapacitor is an electrochemical capacitor that has an unusually high energy density when compared to common capacitors.

SUMMARY OF THE INVENTION

In one aspect of the invention, a hybrid power system comprises a power source and a power storage element receiving energy from said power source, wherein said power storage element stores energy received from said power source while simultaneously providing energy to a load.

In another aspect of the invention, a method of operating a hybrid power system comprises charging a first capacitance bank, charging a second capacitance bank. The first charged capacitance bank is connected to a load and the second charged capacitance bank is connected to an energy source. The first capacitance bank is then disconnected from the load and connected to the energy source. The second capacitance bank is connected to the load. The first capacitance bank is then connected to the load and the second capacitance bank is disconnected from the load. The second capacitance bank is then connected to the energy source.

In a further aspect of the invention, a hybrid power system comprises a fuel cell, a DC/DC converter electrically connected to the fuel cell and converting the energy level of the energy supplied by the fuel cell. A first switch is electrically connected to the DC/DC converter or some other DC source. A first and second capacitance banks are electrically connected to the first switch and a second switch respectively. A controller is connected to the first switch and the second switch. The controller monitors the charge levels of the first supercapacitor and the second supercapacitor and controls the first switch and the second switch in response to the charge levels. A load is electrically connected to the second switch. When the first switch connects the DC/DC converter to the first capacitance bank, the second switch connects the second supercapacitor to the load. When the first switch connects the DC/DC converter to the second capacitance bank, the second switch connects the first capacitance bank to the load.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention is a hybrid power system to provide power for electrical vehicles, robots and other electrical devices having varieties of power demands.

A typical power source optimally provides either low currents or large currents. A capacitor, which is a higher power density but lower energy density device, is typically capable of providing a large current for a short period. A fuel cell, which is a higher energy density but lower power density device, may provide smaller currents for a lengthy period of time. A hybrid power source may include a power source providing low currents for extended periods of time integrated with a power storage element capable of providing large currents for short periods of time. A super-capacitor bank periodically recharged by fuel cells may provide the load with the necessary currents, as needed, resulting in a power source with optimal levels of energy and power densities.

Figure 1:
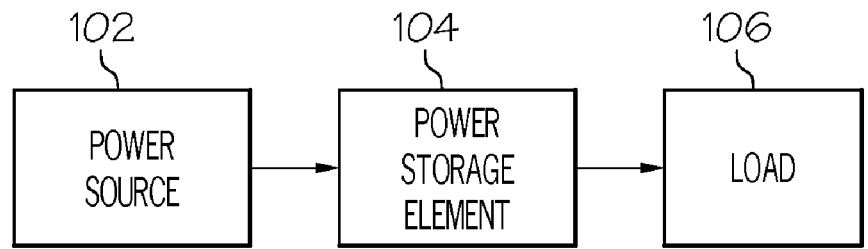
FIG. 1 is a block diagram depicting a hybrid power system in accordance with an embodiment of the present invention.

With reference to FIG. 1, a hybrid power system 100 in accordance with an embodiment is shown. A power source 102 may provide energy to power storage element 104. A fuel cell may be used as the power source 102 for the hybrid power system 100. Fuel cells may provide a steady source of power for as long as the cells remain fuelled. Batteries such as lithium primary or secondary batteries may be used as a power source 102. The power storage element 104 may be charged by the energy provided by the power source 102. Supercapacitors may be used as a power storage element 104. Power storage element 104 may store the energy provided by the power source 104 until the energy may be demanded by a load 106.

Figure 2:
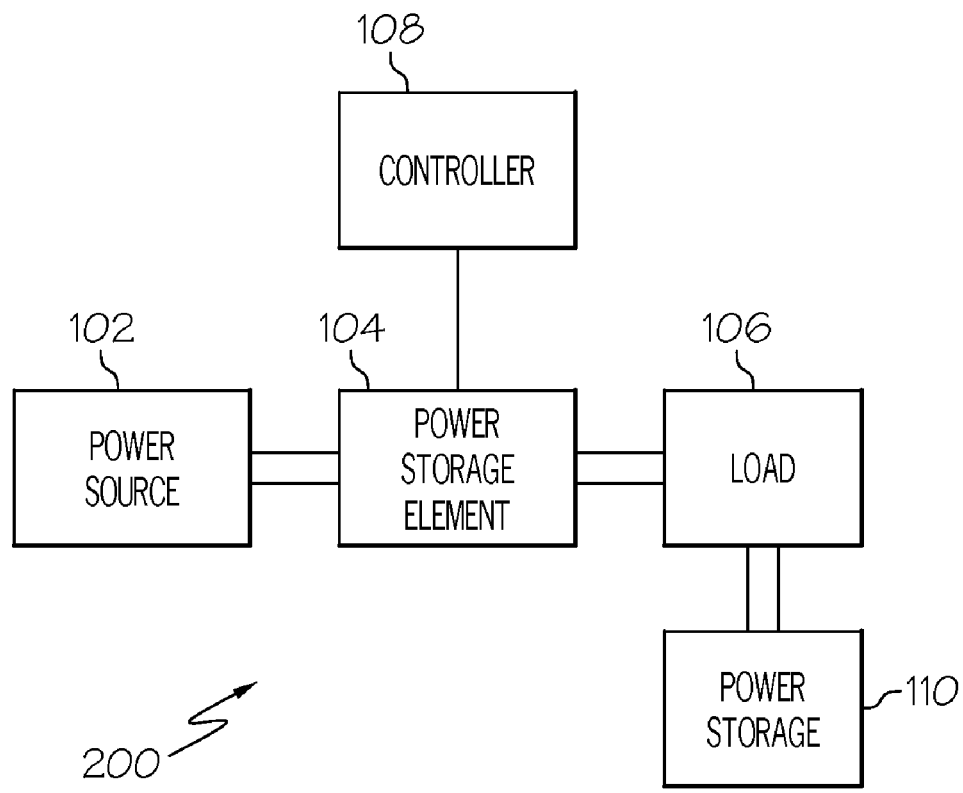
FIG. 2 is a block diagram depicting a controlled hybrid power system in accordance with an embodiment.

With reference to FIG. 2, a controlled hybrid power system 200 in accordance with an embodiment is shown. A power source 102 may provide energy to a power storage element 104 where the energy may be stored. Load 106 may draw power as needed from the power storage element 104. Further power storage 110 such as a battery may be charged. A controller 108 may be connected to the power storage element 104 to monitor charge levels of the power storage element 104, and connect power source 102 to the power storage element as needed.

Figure 3:
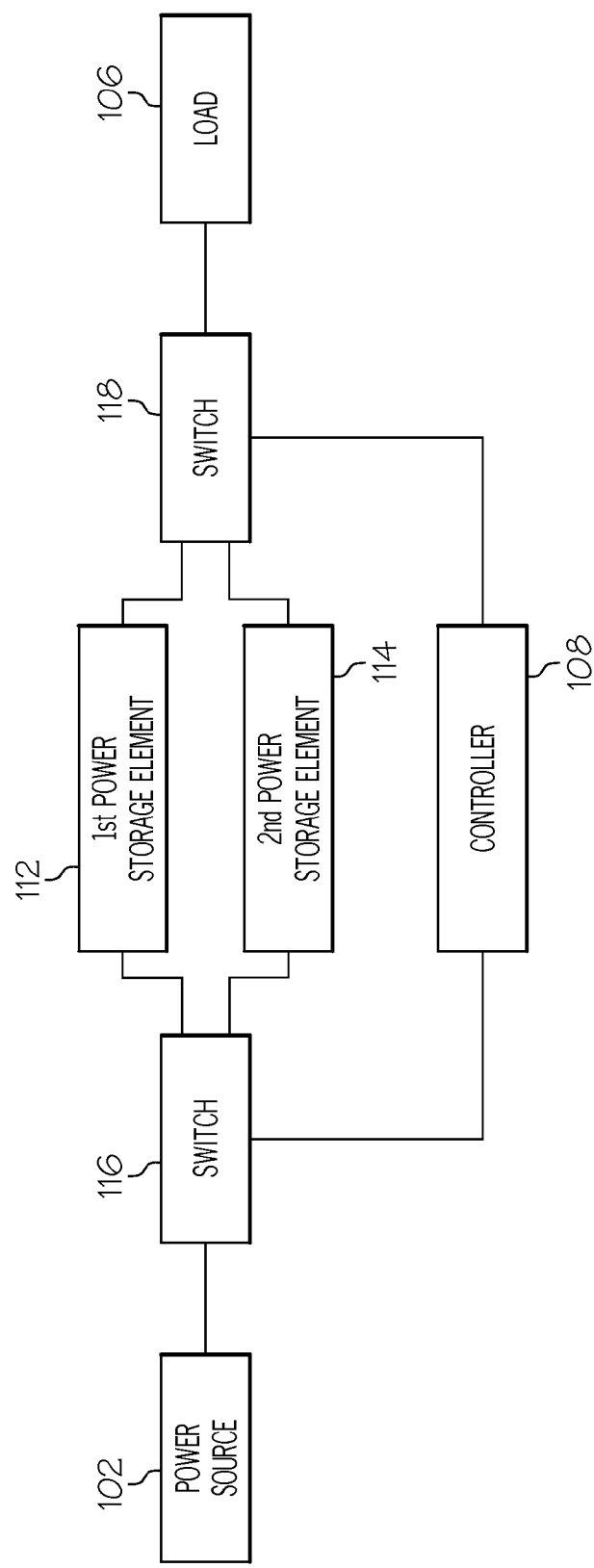
FIG. 3 is a block diagram depicting a controlled dual storage hybrid power system in accordance with an embodiment.

With reference to FIG. 3, a controlled dual-storage hybrid power source 300 in accordance with an embodiment is shown. A pair of power storage elements 112 and 114 may be charged by power from a power source 102. The load 106 may receive power from the power storage elements 112 and 114. A first switch 116 may route power from the power source 102 to the first power storage element 112 until the first switch 116 may be instructed by the controller 108 to route the power from the power source 102 to the second power storage element 114. Using the first switch 116, the controller 108 may regulate the flow of power from the power source 102 to charge the power storage elements 112 and 114 alternately. A second switch 118 may alternately route power from the power storage elements 112 and 114 to the load 106. The controller 108 may control the switches 116 and 118 so that when the first power storage element 112 may be charged, the load 106 may draw power from the second power storage element 114 and when the second power storage element 114 may be charged, the load may draw power from the first power storage element 112. The controller 108 may be an oscillator. In accordance with an embodiment of the invention, controller 108 may include a programmed microprocessor.

Typically, each of the power storage elements 112 and 114 may be identical capacitance banks. Alternately, the power storage elements 112 and 114 may be capacitance banks of various capacitance values. Each capacitance bank 112, 114 may include a specified number of capacitor cells in series, where the number of cells may be selected to comply with specified load voltage requirements. In addition, the capacitance banks 114, 116 may consist of parallel strings of cells, where the number of cells and strings may be chosen to provide the necessary capacitance value. The specifications may be determined with reference to appropriate capacitor bank weight, volume, cost, charge voltage, current and timing.

In addition to controlling the switches 116 and 118, the controller 108 may monitor various system voltages such as the voltage level of the capacitance banks 114, 116 and system currents, such as the current level supplied by the fuel cell 102, of the hybrid power source 300. The controller 108 may operate a load switch 118 to connect and disconnect the power storage elements 112 and 114 to and from the load 106 so that power may be available to the load at all times. A 'make before break' switching scheme may be implemented accordingly.

Figure 4:
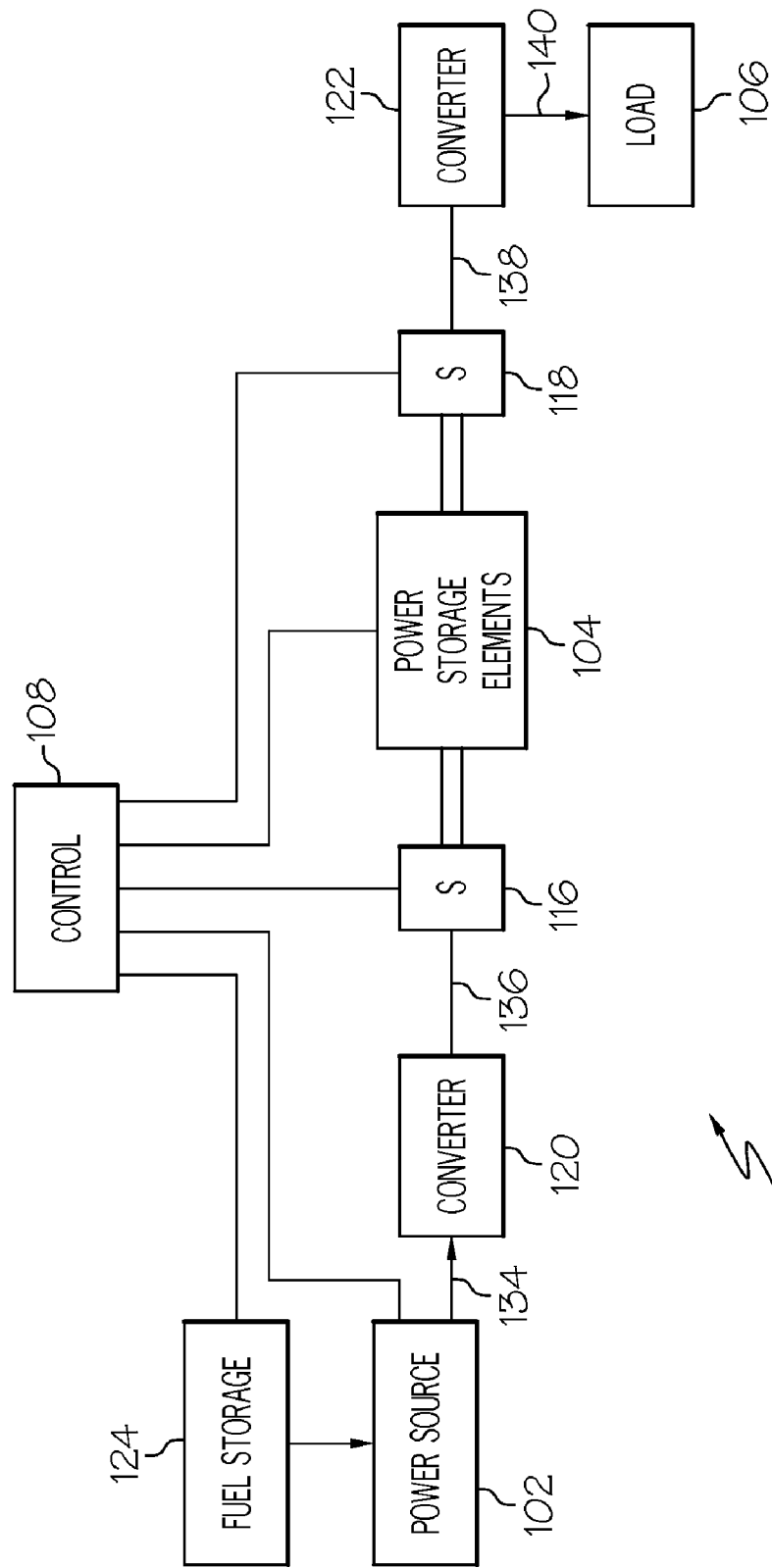
FIG. 4 is a block diagram depicting a converted hybrid power system in accordance with an embodiment.

With reference to FIG. 4, a converted hybrid power system 400 in accordance with an embodiment is shown. A power source 102 may include fuel cells receiving fuel from a fuel storage unit 124. The power source 102 may provide energy at a given voltage level that may be different from the voltage levels needed to charge the power storage elements 104 and support the load, so the energy from the power source 102 may be sent through a first converter 120. The first converter 120 may be typically a standard DC/DC converter to convert the input voltage level 134 to an output voltage level 136. A first switch 116 may route the energy received from the converter 120 to one of the capacitance banks 114, 116 in the power storage elements 104 in accordance with control signals received from controller 108. A load switch 118 may route the energy from one of the capacitance banks 114 and 116 in the power storage elements 104 in accordance with control signals received from the controller 108. The power storage elements 104 may provide energy at a given voltage level that may be different from the voltage levels needed by the load 106, so the energy from the power storage elements 104 may be sent through a second converter 122. The second converter 122 may be typically a standard DC/DC converter to convert the input voltage level 138 to an output voltage level 140. The controller 108 may receive signals from the fuel storage 124, power source 102 and power storage elements 104 indicating fuel levels, energy levels and charge levels.

Figure 5:
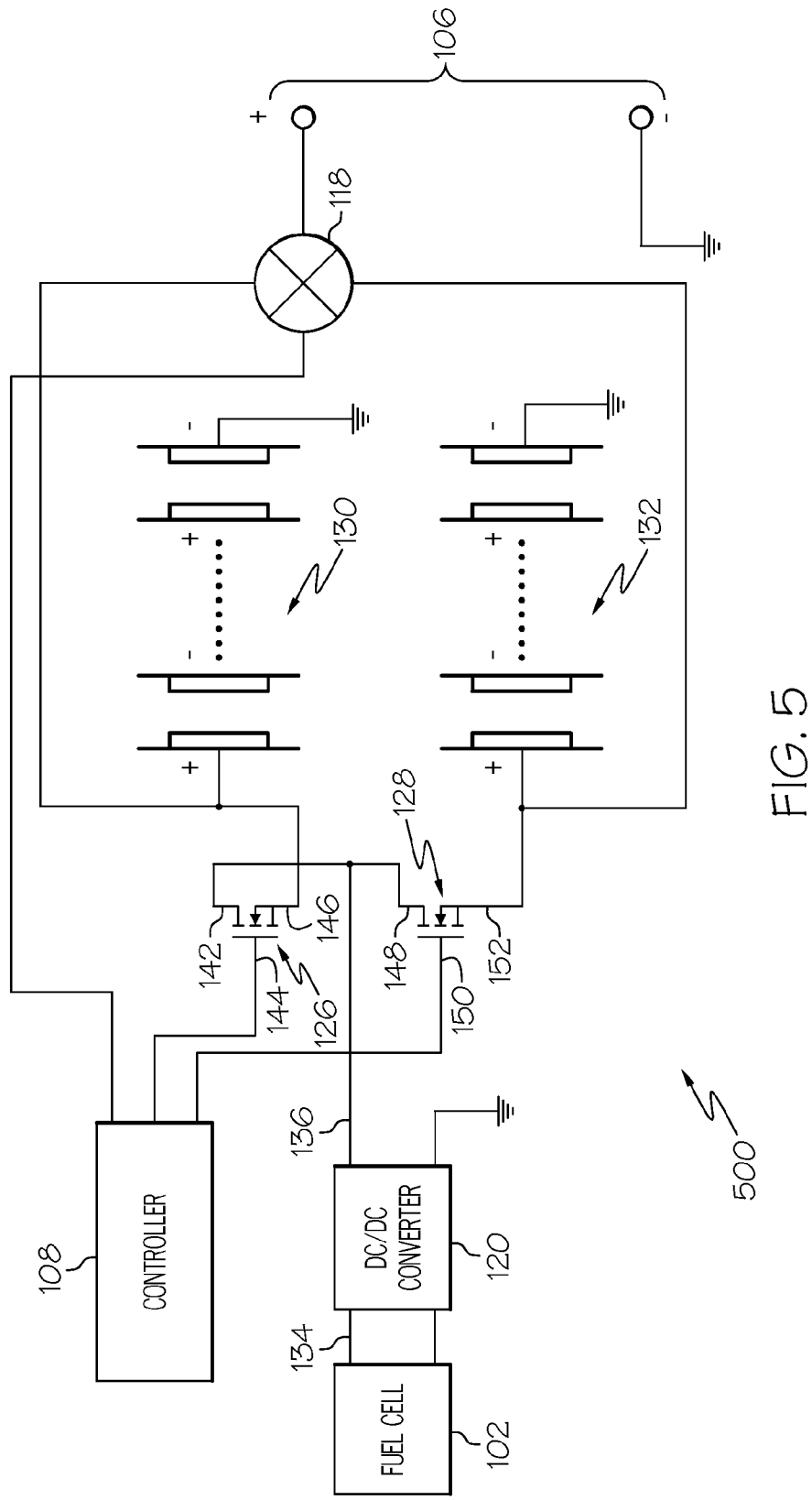
FIG. 5 is a block diagram depicting a supercapacitor bank hybrid power system in accordance with an embodiment.

With reference to FIG. 5, a supercapacitor bank hybrid power system 500 in accordance with an embodiment is shown. A fuel cell 102 may generate energy which may be then stepped-up by a DC/DC converter 120. The energy may be provided to the sources 142, 148 of MOSFETs 126, 128 (Metal Oxide Semiconductor Field Effect Transistor). The drains 146, 152 of MOSFETs 126, 128 may alternately provide energy to one of the capacitance banks 130, 132. Likewise, load switch 118 may alternately provide current from one of the capacitance banks 130, 132 to the load 106. The MOSFETs 126, 128 may be controlled by controller 108 connected to gates 144, 150. The load switch 118 may be controlled by controller 108.

MOSFET switches 126, 128 may be used to apply charge energy to individual capacitance banks 130, 132 such that while one bank 130 may be providing energy to the load, the other bank 132 may be charged by energy from the fuel cell 102. While two capacitance banks 130, 132 may be shown in the present embodiment, it should be understood that any number of capacitance banks could be implemented in accordance with another embodiment. The switching sequence of the MOSFETs 126, 128 may be managed by the controller 108 connected to gates 144, 150. The switches 126, 128, 118 may be implemented using MOSFETs or any suitable switch compatible with electronic control and providing appropriate resistance.

Figure 6:
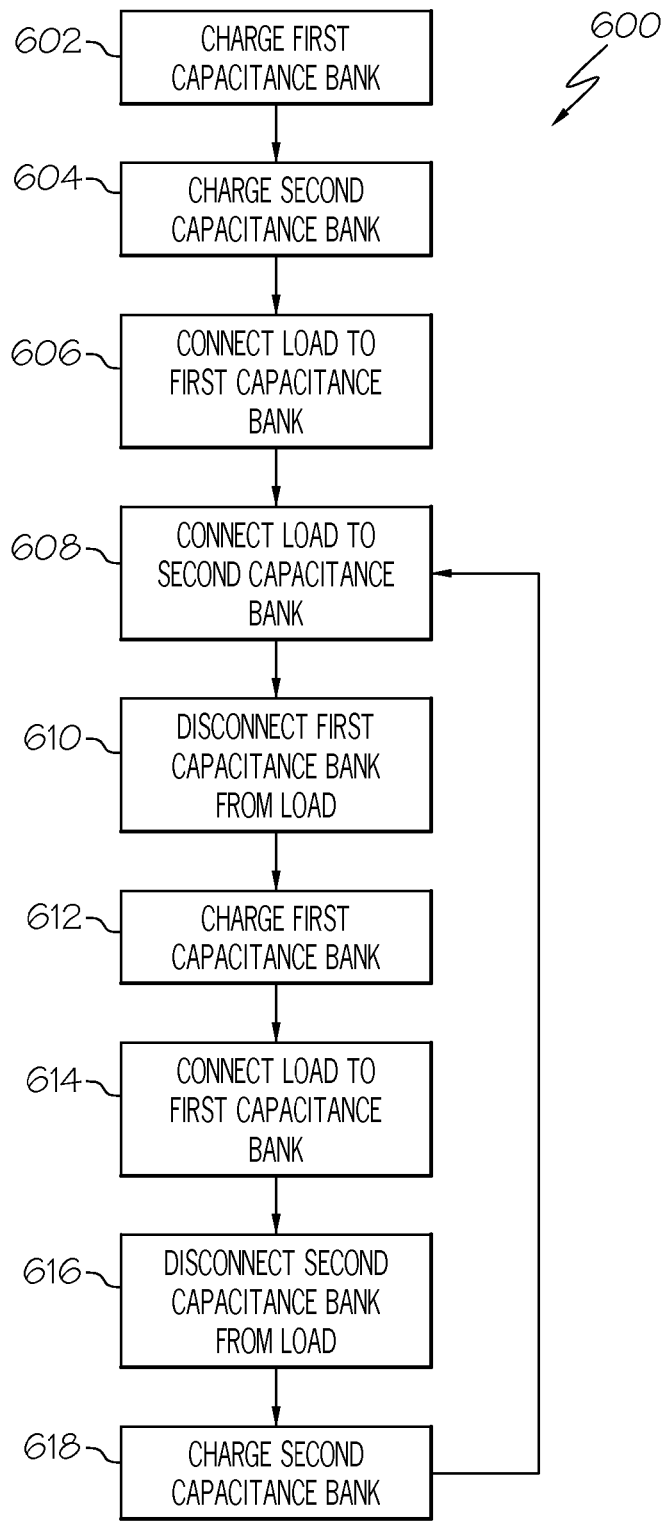
FIG. 6 is a flow diagram depicting a simplified process of operating a hybrid power system in accordance with an embodiment.

With reference to FIG. 6, a process 600 of operating a hybrid power system 500 in accordance with an embodiment is shown. Initially, a first capacitance bank 130 may be charged at function block 602 and a second capacitance bank 132 may be charged at function block 604. The load may be connected the first capacitance bank at function block 606. After a predetermined time, typically sufficient to charge the second capacitance bank 132 and before the first capacitance bank 130 may be completely discharged, the load 106 may be connected to the second capacitance bank 132 at function block 608. The first capacitance bank 130 may be disconnected from the load 106 at function block 610. The first capacitance bank 130 may be connected to the fuel cell 102 and may be charged at function block 612. After the predetermined time elapses, a fully charged first capacitance bank 130 may be connected to the load 106 at function block 614. The second capacitance bank 132 may be disconnected from the load 106 at function block 616 and connected to the fuel cell 102 to be charged at function block 618. The process may cycle after the predetermined period elapses, connecting the load 106 to the second capacitance bank 132 at function block 608.

Figure 7:
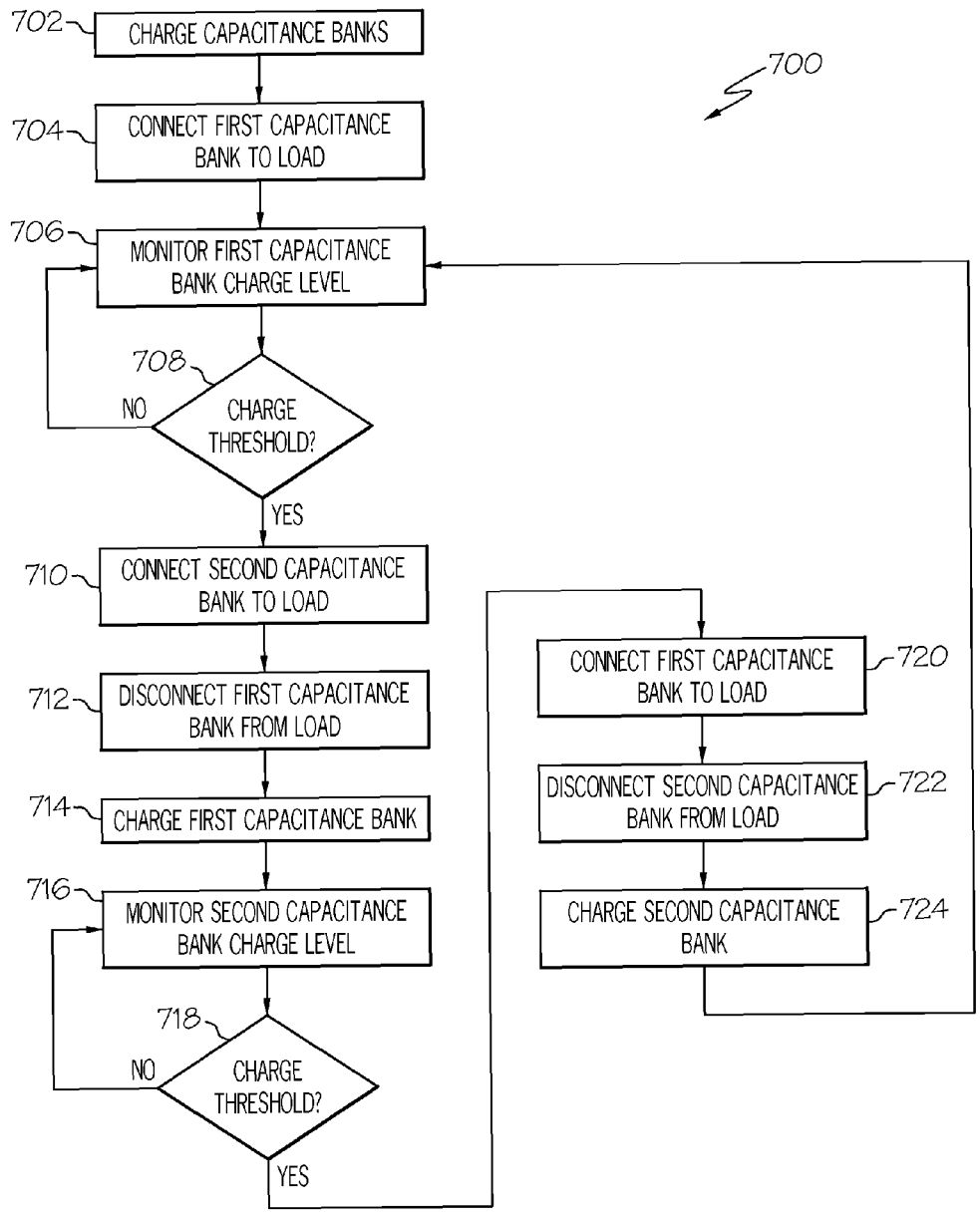
FIG. 7 is a flow diagram depicting a process of operating a monitored hybrid power system in accordance with an embodiment.

With reference to FIG. 7, a process 700 of operating a hybrid power system 500 in accordance with an embodiment is shown. The capacitance bank 130, 132 may be initially charged at function block 702. The first capacitance bank 130 may be connected to the load 106 at function block 704. The charge level of the first capacitance bank 130 may be monitored by the controller 108 at function block 706. The charge level of the first capacitance bank 130 may be compared to a predetermined threshold at decision block 708. Until the charge level reaches the threshold, the process follows the NO path and continues monitoring the charge level. When the charge level reaches the threshold, the process follows the YES path. The second capacitance bank 132 may be connected to the load 106 at function block 710. The first capacitance bank 130 may be disconnected from the load 106 at function block 712 and connected to the fuel cell 102 to be recharged at function block 714. The second capacitance bank charge level may be monitored at function block 716. The charge level of the second capacitance bank 132 may be compared to a predetermined threshold at decision block 718. Until the charge level reaches the threshold, the process follows the NO path and continues monitoring the charge level. When the charge level reaches the threshold, the process follows the YES path. The first capacitance bank 130 may be connected to the load 106 at function block 720. The second capacitance bank 132 may be disconnected from the load 106 at function block 722 and connected to the fuel cell 102 to be recharged at function block 724. The cycle repeats and the first capacitance bank charge level may be monitored at function block 706.

It should be understood, of course, that the foregoing relates to exemplary embodiments of the invention and that modifications may be made without departing from the spirit and scope of the invention as set forth in the following claims.

I claim:
1. A method of operating a hybrid power system comprising:
charging a first capacitance bank;
connecting said first charged capacitance bank to a load;
charging a second capacitance bank;
connecting said second charged capacitance bank to the load;
disconnecting said first capacitance bank from said load;
connecting said first capacitance bank to an energy source while the second capacitance bank is connected to the load;
connecting said first capacitance bank to said load;
disconnecting said second capacitance bank from said load and connecting said second capacitance bank to an energy source while the first capacitance bank is connected to the load.
2. The method of claim 1 further comprising converting energy from said energy source prior to connection to the first capacitance bank and the second capacitance bank.
3. The method of claim 1, further comprising monitoring the charge of either the first or the second capacitance bank and sending a control signal to connect the charge monitored capacitance bank to said load when said charge reaches a predetermined level.
4. The method of claim 1, further comprising monitoring an output voltage level of either the first or second capacitance bank and sending a control signal to connect the voltage-level monitored capacitance bank to said load when said voltage level reaches a predetermined level.
5. A hybrid power system comprising:
a fuel cell;
a DC/DC converter electrically connected to said fuel cell and converting the energy level of the energy supplied by the fuel cell;
a first switch electrically connected to the DC/DC converter;
a first supercapacitor electrically connected to the first switch;
a second supercapacitor electrically connected to the first switch;
a second switch electrically connected to the first supercapacitor and to the second supercapacitor;
a controller connected to said first switch and said second switch, monitoring charge levels of said first supercapacitor and said second supercapacitor and controlling said first switch and said second switch in response to said charge levels;
a load electrically connected to the second switch;
wherein said first switch connects the DC/DC converter to the first supercapacitor when the second switch connects the second supercapacitor to the load and wherein said first switch connects the DC/DC converter to the second supercapacitor when the second switch connects the first supercapacitor to the load.
6. The hybrid power system of claim 5 wherein said load is an electrical vehicle traction motor.
7. The hybrid power system of claim 5 wherein said load is a robotic device electromechanical control.
8. The hybrid power system of claim 5 wherein said load comprises a load battery.

\* \* \* \* \*